US006779187B1

(12) United States Patent
Hammond

(10) Patent No.: US 6,779,187 B1
(45) Date of Patent: *Aug. 17, 2004

(54) METHOD AND SYSTEM FOR DYNAMIC INTERCEPTION OF FUNCTION CALLS TO DYNAMIC LINK LIBRARIES INTO A WINDOWED OPERATING SYSTEM

(75) Inventor: Richard P. Hammond, Simsbury, CT (US)

(73) Assignee: Novadigm, Inc., Mahwah, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/499,423

(22) Filed: Feb. 7, 2000

Related U.S. Application Data

(63) Continuation-in-part of application No. 09/289,149, filed on Apr. 8, 1999, now Pat. No. 6,550,060.

(51) Int. Cl.$^7$ ................................................ G06F 9/00
(52) U.S. Cl. ...................................... 719/331; 719/332
(58) Field of Search ............................... 719/331, 332; 717/111, 162

(56) References Cited

U.S. PATENT DOCUMENTS

| | | | |
|---|---|---|---|
| 5,583,761 A | 12/1996 | Chou | |
| 5,673,315 A | 9/1997 | Wolf | |
| 5,812,848 A | 9/1998 | Cohen | |
| 5,958,010 A | 9/1999 | Agarwal et al. | |
| 6,141,698 A | * 10/2000 | Krishnan et al. | 719/331 |
| 6,202,199 B1 | 3/2001 | Wygodny et al. | |
| 6,463,583 B1 | 10/2002 | Hammond | |
| 6,698,016 B1 | * 2/2004 | Ghizzoni | 717/162 |

FOREIGN PATENT DOCUMENTS

| | | |
|---|---|---|
| EP | 0752647 | 1/1997 |
| WO | 9833106 | 7/1998 |

OTHER PUBLICATIONS

Jeffrey Richter, "Breaking Through Process Boundary Walls", Advanced Windows 3rd ed., Microsoft Press, pp. 899–969, 1997.

(List continued on next page.)

*Primary Examiner*—Meng-Al T. An
*Assistant Examiner*—The Thanh Ho
(74) *Attorney, Agent, or Firm*—Gardner Carton & Douglas LLP

(57) ABSTRACT

Methods and system for dynamically intercepting exported functions for dynamic link libraries for a process in a windowed operating system. The methods and system allow calls to exported functions in a dynamic link library on a windowed operating system to be dynamically intercepted. The methods and system include using an interception driver to determine if any exported function calls should be intercepted, and an interception dynamic link library to dynamically intercept exported functions calls. The interception dynamic link library includes an interception table to record exported functions that will be intercepted and a global interception function. The global interception function includes one or more calls to before-interception functions, replacement functions and after-interception functions that can be called with a pre-determined priority for an intercepted function. The methods and system may be used to determine what resources a process uses on a windowed operating system, alter the behavior of specific functions in order to alter how an application executes, or for other monitoring or debugging purposes. The methods and system are not process or application specific can be used to intercept exported function calls for virtually any process on a windowed operating system such as Windows 95, Windows 98, Windows NT and others, and supports dynamic interception of multiple exported functions for multiple processes.

32 Claims, 13 Drawing Sheets

OTHER PUBLICATIONS

Hunt G. et al., "Detours: Binary Interception of Win32 Functions", Tech. Rep. MSR–TR–98–33, Microsoft Research, Microsoft Corp., .research.microsoft.com/pub/tr/tr–98–33, pdf., pp. 1–9.

"DLLaGator Version 2.0 General Availability", Chicago–Soft, Hanover, NH, Apr. 6, 1998, .chicagosoft.com/htm/in_the_lab_DLLagator_availability.html, pp. 1–3.

Kaspersky, E.V. "Win95.K32", Central Command Inc., 1998, .avpve.com/viruses/win95/k32html, p. 1.

Livingston, B., "Window Manager, Applications can help you get out of life in DLL hell," Infoworld, Infoworld Media Group Inc., Feb. 16, 1998, vol. 20, Issue 7, archive.infoworld.com/cgi–bin/displayArchive.pl?98/07/o02–07, 38.htm, pp. 1–3.

Disclosure Bulletin, IBM Corp., Jun. 1, 1997, vol. 40, No. 6, pp. 77–79.

* cited by examiner

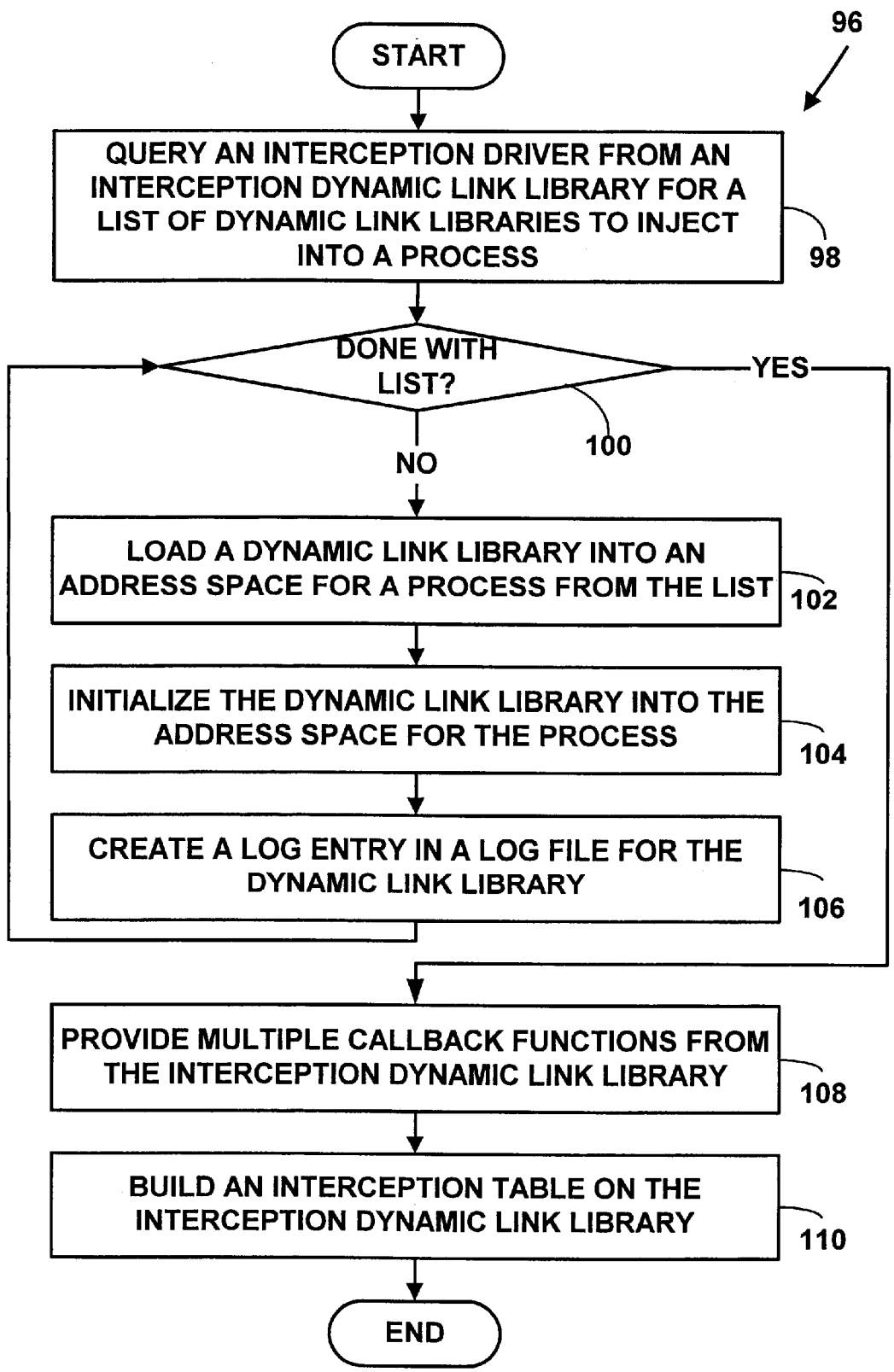

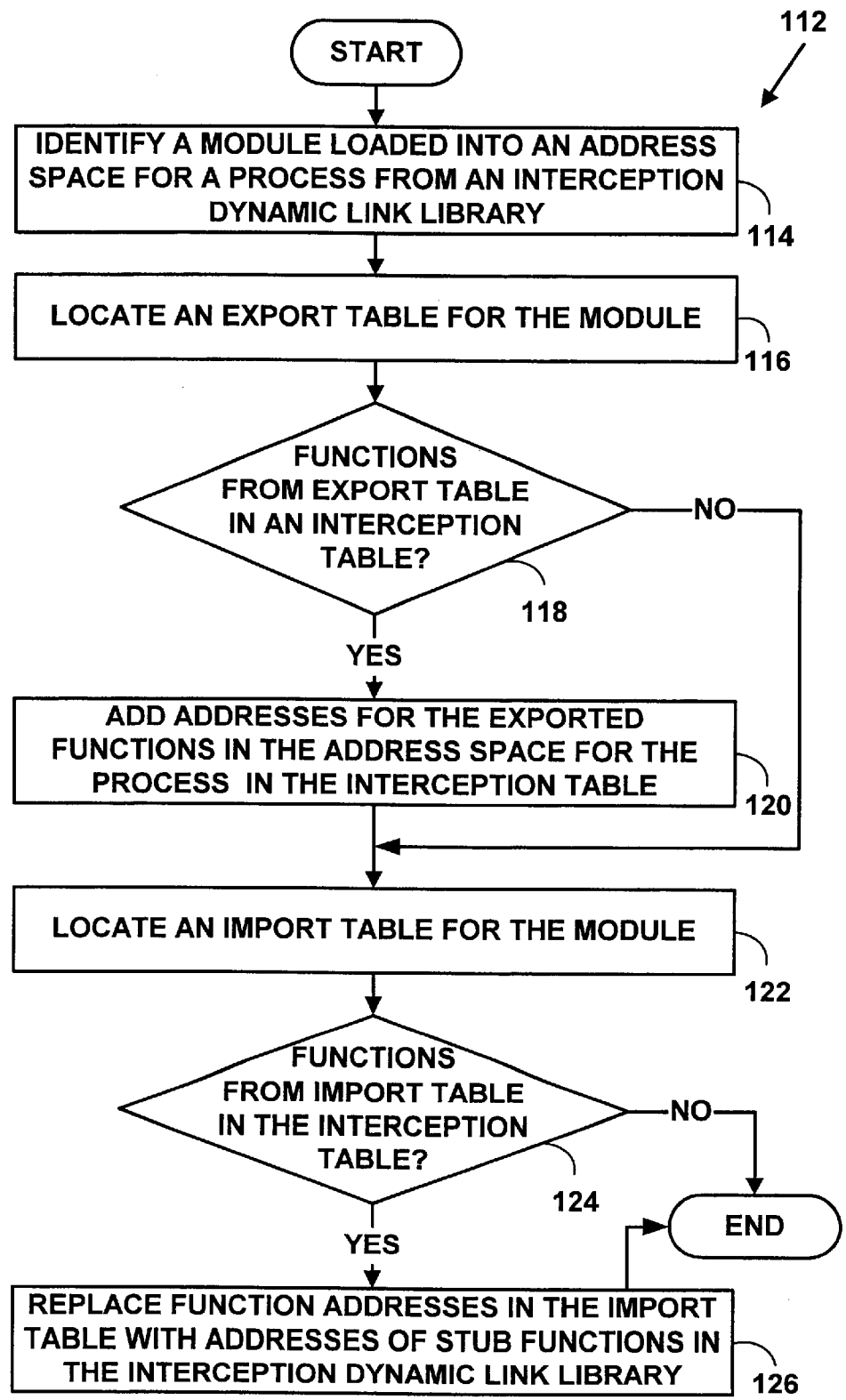

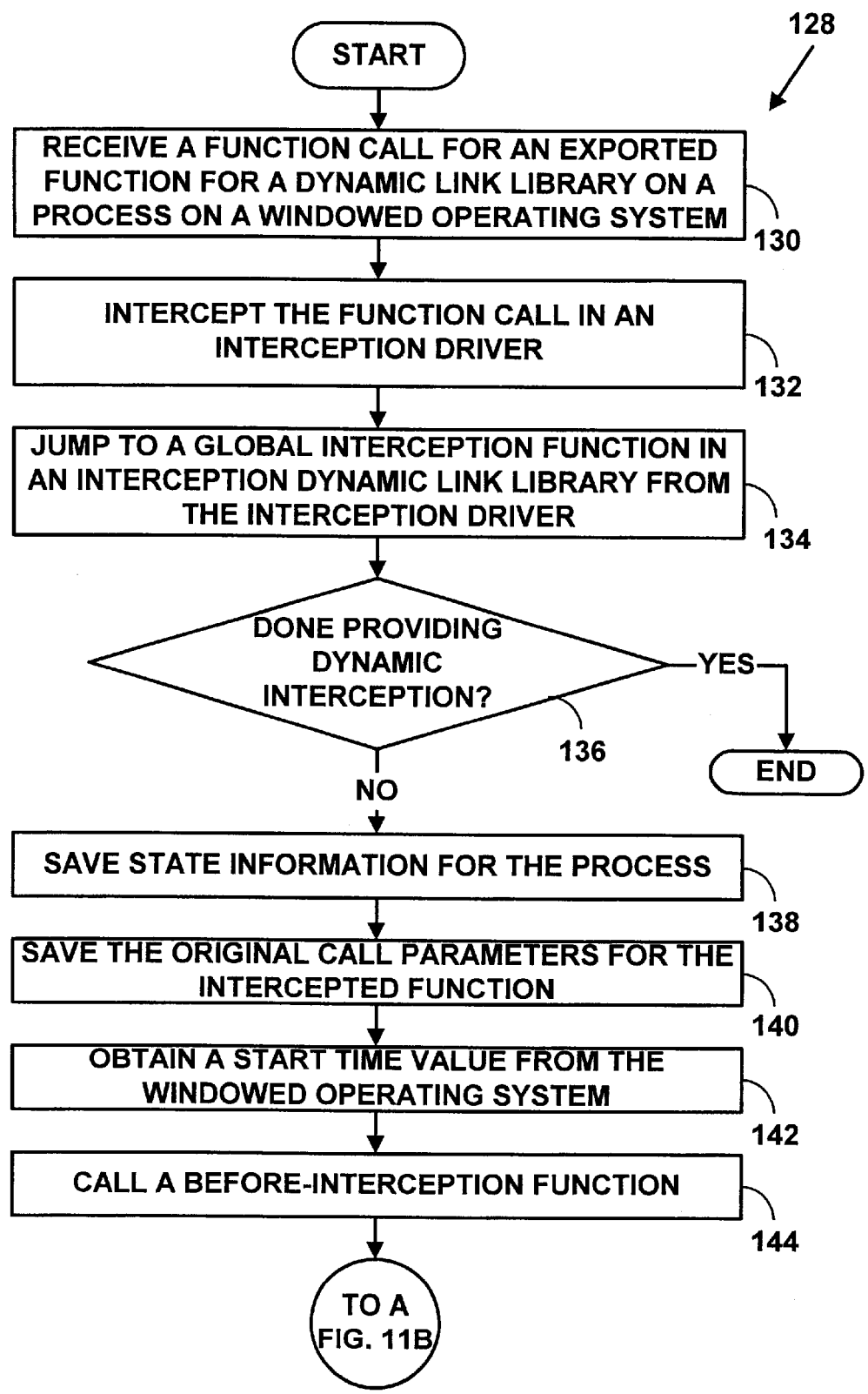

METHOD AND SYSTEM FOR DYNAMIC INTERCEPTION OF FUNCTION CALLS TO DYNAMIC LINK LIBRARIES INTO A WINDOWED OPERATING SYSTEM

CROSS REFERENCES TO RELATED APPLICATIONS

This application is a Continuation-In-Part of U.S. application Ser. No. 09/289,149, filed on Apr. 8, 1999; now U.S. Pat. No. 6,550,060.

FIELD OF INVENTION

This invention relates to computer operating systems. More specifically, it relates to a method and system for dynamic interception of exported function calls to dynamic link in a windowed operating system.

BACKGROUND OF THE INVENTION

Software applications, such as 32-bit applications (e.g., Win32) for windowed operating systems, such as Windows 95/98/NT, (hereinafter "Windows") by Microsoft Corporation of Redmond, Wash., execute as separate processes that execute within their own address space. The Windows operation systems typically limit code that can execute within an address space to the code associated with a main executable module (e.g., ".EXE") and Dynamic Link Library ("DLL") modules loaded by a process associated with the main executable module. As is known in the art, a Dynamic Link Library provides a mechanism for linking applications to libraries of functions at run-time.

There are situations where it is desirable to intercept calls to functions that are exported by Dynamic Link Libraries. As is known in the art, when a function in a Dynamic Link Library is made available to an executable module ("EXE") or another Dynamic Link Library, the function is "exported." The interception of a function call can be used to monitor an application calling the function or alter the behavior of the application. For example, intercepting exported function calls from the Windows core operating system modules in a Dynamic Link Library can be used to identify or correct problems associated with an application running different computing platforms. Most Windows based applications gain access to module files, data files, registry settings, and other resources via functions exported by Dynamic Link Libraries. By intercepting exported function calls for Dynamic Link Libraries, a monitoring application can determine what resources are being used by a Windows based application. In addition, an interception function can also alter the behavior of specific functions or alter how an application performs.

Current interception techniques for Dynamic Link Libraries known in the art typically work by altering exported function address entries in an import table for specific functions. The exported function address entries are replaced with the address of an interception routine. The interception routine can record the intercepted function calls, alter the parameters of the function call and call the export function, or call a replacement function.

One problem with the interception techniques for Dynamic Link Libraries known the art is that the techniques are designed to work only for one specific target application. Such interception techniques typically use debugging functions from the Debugging Application Program Interface ("API") provided with Windows to attach to a single application's address space to intercept exported Dynamic Link Library function calls.

Another problem is that the techniques are typically designed to perform only a single function such as Application Program Interface function call monitoring from a Dynamic Link Library. This limits the ability to support dynamic interception of multiple function calls for multiple purposes for multiple applications.

Another problem is that the techniques do not work on all processes, typically do not intercept calls to any exported Dynamic Link Library function from any non-operating system applications, or set-up interception logic before any application related logic is executed. This limits the type of applications that interceptions can be performed on.

Yet another problem is that the techniques do not provide the ability to execute multiple callback functions before an exported function from a Dynamic Link Library is called, execute multiple callback functions that replace an exported function or execute multiple callback functions after the exported function is called.

Thus, it is desirable to provide new interception techniques for exported functions from Dynamic Link Libraries. The new interception techniques should work with virtually any application used on Windows operating systems and provide a flexible way to intercept exported function calls for Dynamic Link Libraries.

SUMMARY OF THE INVENTION

In accordance with preferred embodiments of the present invention, some of the problems associated with intercepting exported function calls to dynamic link libraries in a windowed operating system are overcome. Methods and system for dynamically intercepting exported function calls to dynamic link libraries into a process in a windowed operating system are provided.

One aspect of the invention includes a method for preparing for dynamic interception of exported function calls for dynamic link libraries. This method includes loading an interception driver that determines if any function calls to any dynamic link libraries should be intercepted for applications that run on a windowed operating system.

Another aspect of the invention includes a method for allowing dynamically intercepting exported function calls for dynamic link libraries. This method includes loading an interception dynamic link library from an interception driver to intercept exported function calls for dynamic link libraries.

Another aspect of the invention includes a method for initializing dynamic interception of exported function calls for dynamic link libraries. This method includes locating import and export tables for an application and creating an interception table in an interception dynamic link library to intercept exported function calls for dynamic link libraries included in the import and export tables.

Another aspect of the invention includes a method for dynamic interception of exported functions call to a dynamic link libraries using a global interception function. The global information function allows one or more before-interception functions, replacement functions and after-interception functions called in a predetermined priority order to alter the behavior of an application based on an intercepted function call.

Another aspect of the invention includes a system for dynamic interception of exported function calls for dynamic link libraries. The system includes an interception driver, and interception dynamic link library, and interception table and a global interception function.

The methods and system of preferred embodiments of the present invention allow calls to exported functions in a dynamic link library on a windowed operating system to be dynamically intercepted. The methods and system may be used to determine what resources a process uses on a windowed operating system, alter the behavior of specific functions in order to alter how an application executes, or for other monitoring or debugging purposes. The methods and system described herein may also be used to intercept exported function calls for virtually any process on a windowed operating system such as Windows 95, Windows 98, Windows NT and others, and supports dynamic interception of multiple exported functions for multiple processes.

The foregoing and other features and advantages of preferred embodiments of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein:

FIG. 9 is a method for initializing dynamic interception of exported function calls for dynamic link libraries;

FIG. 10 is a method for dynamic interception of exported function calls for dynamic link libraries;

FIGS. 11A and 11B are a flow diagram illustrating a method dynamic interception of an exported function call to a dynamic link library using a global interception function.

DETAILED DESCRIPTION OF PREFERRED EMBODIMENTS

Exemplary Computing System

Figure 1:
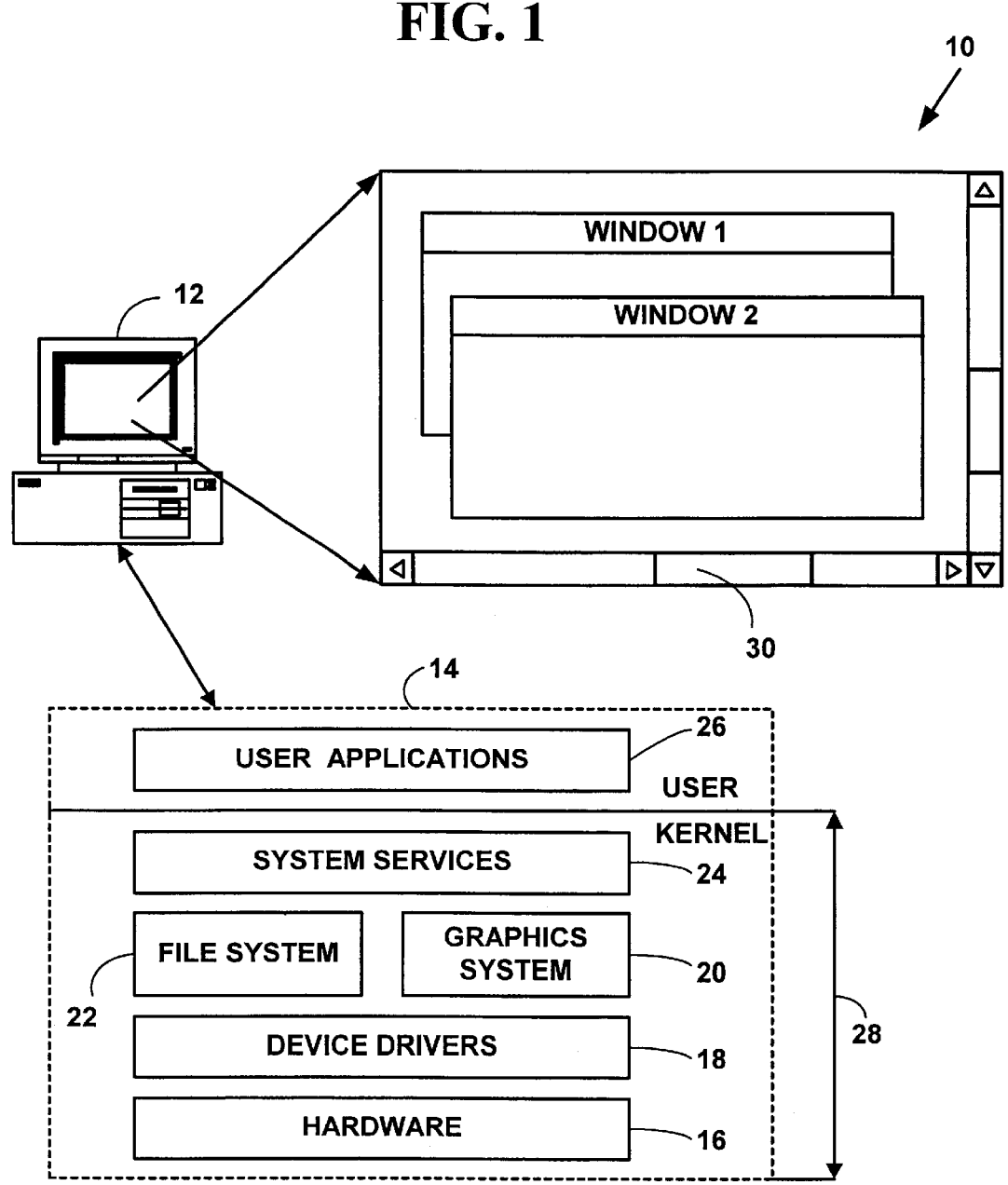
FIG. 1 is a block diagram illustrating an exemplary computing system.

FIG. 1 is a block diagram illustrating an exemplary computing system 10 for a one embodiment of the present invention. The computing system 10 includes a computer 12 with a generic windowed operating system 14. The generic windowed operating system 14 generally includes a hardware layer 16, a device driver layer 18, a file system layer 20, a graphics system layer 22, a system services layer 24 and a user applications layer 26. The hardware layer 16, device driver layer 18, file system layer 20, graphics system layer 22, and system services layer 24 comprise an operating system kernel 28. The generic windowed operating system 14 provides a Graphical User Interface ("GUI") 30 with multiple windows. However, more or fewer windowed operating system components could also be used and the present invention is not limited to the generic windowed operating system components illustrated in FIG. 1.

The hardware layer 16 is the actual hardware on the computer 12 such as monitor, keyboard, disk drive, etc. The device driver layers 18 is used to interact with actual hardware in the hardware layer 16. The file system layer 20 is used to create, save, retrieve and delete files. The graphic system layer 22 is used to create the GUI 30 with the multiple windows. The system services layer 24 is used to provide windowed operating system services. The user application layer 26 is used to provide user applications that interact with the windowed operating system kernel 28.

An operating environment for the computing system 10 for preferred embodiments of the present invention include a processing system with at least one high speed Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Injecting Injection Logic for using Dynamic Link Libraries into a Windowed Operating System As is known in the art, a Dynamic Link Library ("DLL") provides a mechanism for linking applications to libraries of functions at run time. These libraries are "dynamically linked" because they are linked to an application when it is loaded and executed rather than when it is linked. When an application uses a DLL, the operating system loads the DLL into memory, resolves references to functions in the DLL so that they can be called by the application, and unloads the DLL when it is no longer needed. Loading a DLL into an address space results in execution of code within a DLL.

Dynamic linking can be performed explicitly by applications or implicitly by the operating system. DLLs are designed to provide resources to applications. DLLs most often appear as files with a ".DLL" filename extension; however, they may also have an executable (".EXE") or other filename extension.

Figure 2:
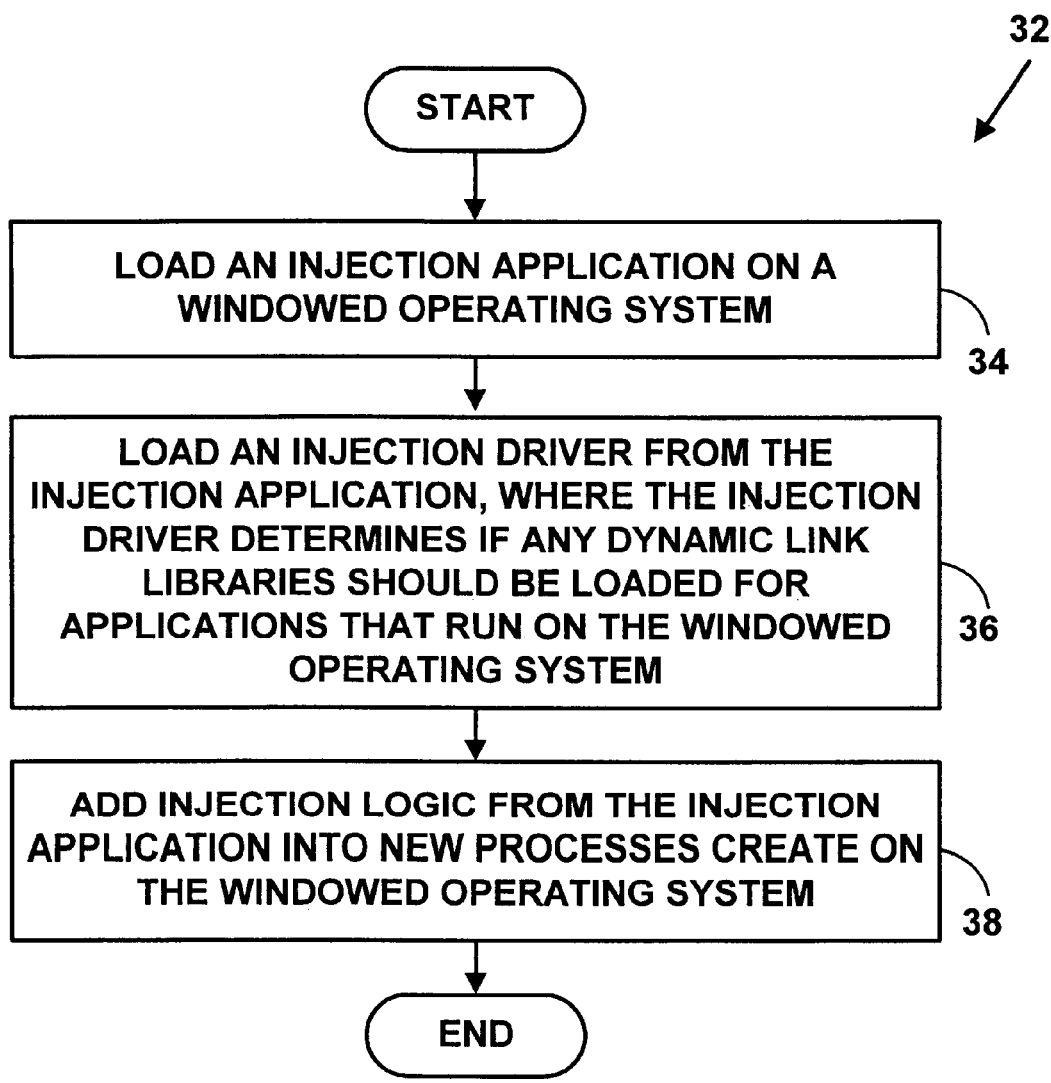
FIG. 2 is a flow diagram illustrating a method for dynamically injecting injection logic into a windowed operating system.

FIG. 2 is a flow diagram illustrating a Method 32 for dynamically injecting injection logic into a windowed operating system. At Step 34, an injection application is loaded on a windowed operating system. The injection application is used to inject injection logic into processes that run on a windowed operating system. The injection logic is executed prior to any application related logic in a process address space created by the windowed operating system. At Step 36, an injection driver is loaded from the injection application. The injection driver includes logic to determine if any dynamic link libraries should be loaded for application related logic associated with a process on the windowed operating system. At Step 38, injection logic is injected into new processes created on the windowed operating system. The injection logic queries the injection driver to determine if any dynamic link libraries should be injected into the new process.

In exemplary preferred embodiments of the present invention, the windowed operating system is any of Windows 95, Windows 98, or Windows NT by Microsoft Corporation of Redmond, Wash. However, the present invention is not limited to windowed operating systems by Microsoft, and other windowed operating systems could also be used. For more information on the Windows 95 operating system see "Advanced Windows," 3$^{rd}$ Edition, by Jeffrey Richter, Microsoft Press, Redmond, Wash., 1997, ISBN 1-57231-548-2, incorporated herein by reference. For more information on the Windows NT operating system see "Beginning Windows NT Programming," by Julian Templeman, WROX Press Inc., Chicago, Ill., 1998, ISBN 1-861000-17-0, incorporated herein by reference.

In one exemplary embodiment of the present invention, at step 34 the injection application is an application used on a windowed operating system that uses shared memory for processes (e.g., Windows 95/98). In another exemplary embodiment of the present invention, to the injection application at step 34 is an injection service used on a windowed operating system that does not use shared memory for processes (e.g., Windows NT).

In preferred embodiments of the present invention at Step 38, injection logic is injected into new processes created on the windowed operating system. In one embodiment of the present invention, injection logic is injected into new processes in a windowed operating system that uses shared memory for processes (e.g., Windows 95/98). Techniques for injecting injection logic for such an embodiment are disclosed in co-pending Application Ser. No. 09/289,150, incorporated herein by reference.

In another embodiment of the present invention, injection logic is injected into existing and new processes in a windowed operating system that does not use shared memory for processes (e.g., Windows NT). Techniques for injecting injection logic for such an embodiment are disclosed in co-pending Application Ser. No. 09/289,149, incorporated herein by reference.

However, other injection techniques could also be used, and the present invention is not limited to the injection techniques described in the co-pending applications. In addition, the present invention is not limited to windowed operating systems from Microsoft.

Dynamically Injecting Dynamic Link Libraries into a Windowed Operating System

Figure 3:
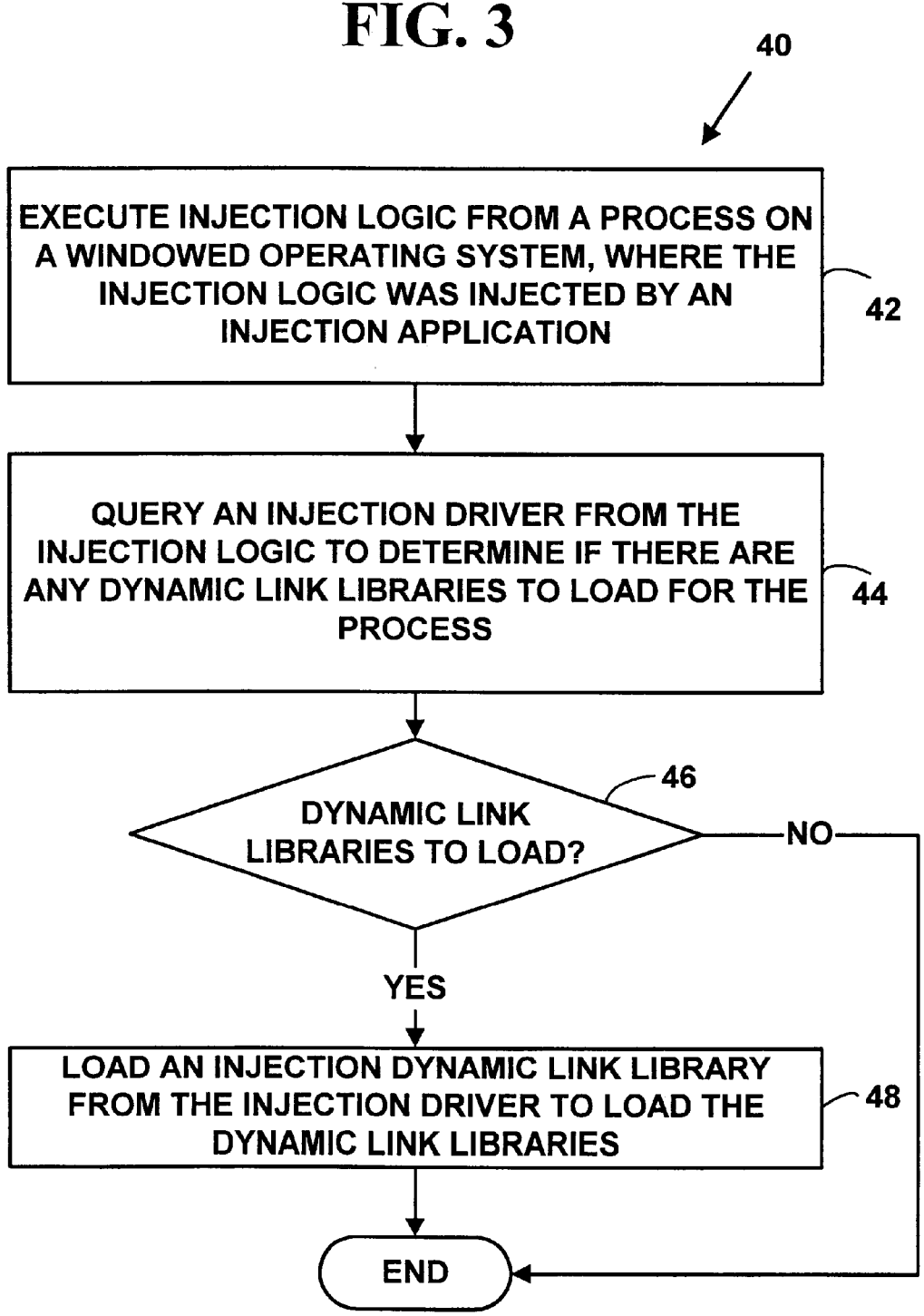
FIG. 3 is a flow diagram illustrating a method for dynamically injecting dynamic link libraries into a process on a windowed operating system.

FIG. 3 is a flow diagram illustrating a Method 40 for dynamically injecting dynamic link libraries into a process on a windowed operating system. At Step 42, injection logic from a process on the windowed operating system is executed. The injection logic was injected into the process with an injection application (e.g., at step 38 of Method 32). At Step 44, an injection driver loaded by the injection application is queried from the injection logic. At Step 46, a test is conducted to determine from the injection driver whether any dynamic link libraries should be injected into a memory space created by the windowed operating system for the process. If any dynamic link libraries should be injected into the memory space for the process, then at Step 48 an injection dynamic link library is loaded to inject the dynamic link libraries into the memory space for the process on the windowed operating system.

The injection dynamic link library includes multiple injection functions for executing injection logic for modifying a main kernel dynamic link library function (e.g., DllMain or RtlImageDirectoryEntryToData) in an original kernel dynamic link library (e.g., KERNEL32.DLL or NTDLL.DLL) to jump to an injection hook function within the injection dynamic link library. The injection functions from the injection dynamic link library are used to execute injection logic prior to executing any other applications related logic in a new process address space created by a windowed operating system. The injection dynamic link library is also used for querying an injection driver from for a list of dynamic link libraries that should be injected into a process on a windowed operating system.

In one exemplary embodiment of the present invention, at Step 42, injection logic from a process on Windows 95/98/NT is executed. The injection logic was injected into the process with Method 32 (FIG. 2). At Step 44, an injection driver loaded by the injection application is queried from the injection logic. The injection driver determines which DLLs to load for a process based on a process's executable module (".EXE") file name, version, Cyclic Redundancy Code ("CRC") or other qualifiers. The injection driver can be statically configured using data files and an operating system registry. As is known in the art, an operating system registry is a hierarchical database that stores hardware, software and user configuration settings for a computer. The injection driver can also be dynamically configured by calling configuration to functions within the injection driver.

At Step 46, a test is conducted to determine from the injection driver whether any DLL should be injected into the memory space for the process on Windows 95/98/NT. If any DLLs should be injected into the memory space for the process, then at Step 48 an injection dynamic link library called INJECT.DLL is loaded by the injection driver to inject the DLLs into the memory space for the process on Windows 95/98/NT.

Figure 4:
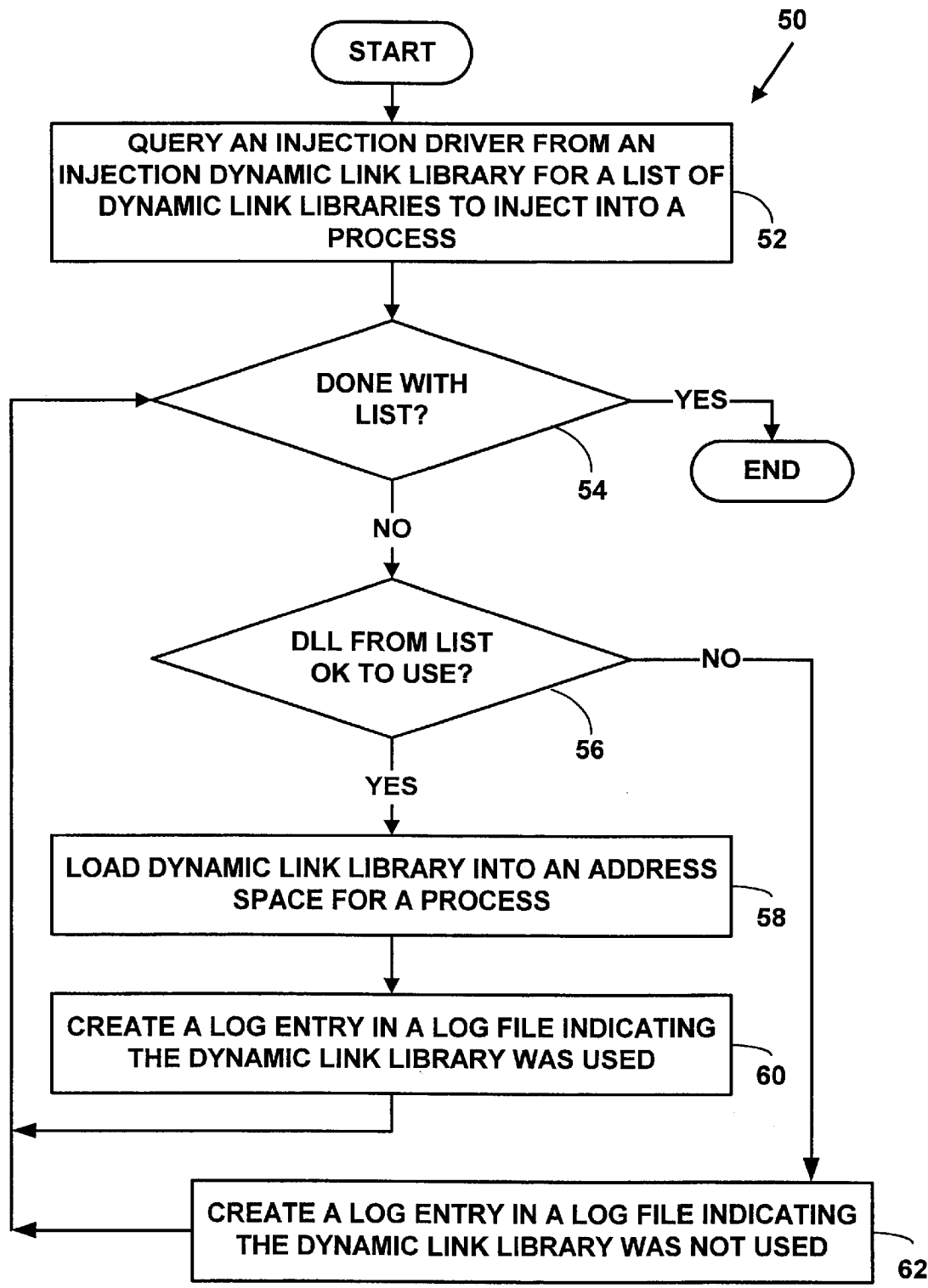
FIG. 4 is a flow diagram illustrating a method for determining which dynamic link libraries should be injected into a process on a windowed operating system.

FIG. 4 is a flow diagram illustrating a Method 50 for determining which dynamic link libraries should be injected into a process on a windowed operating system. At Step 52, an injection driver is queried from an injection dynamic link library for a list of dynamic link libraries that should be injected into a process on a windowed operating system. At Step 54, a loop is entered to repeat steps 56, 58, 60 and 62 from the injection dynamic link library using the list of dynamic link libraries obtained from the injection driver. At Step 56, a test is conducted to determine if a dynamic link library from the list is appropriate to load into the memory space for the process created by the windowed operating system. If the dynamic link library is appropriate to load into the memory space for the process, at Step 58 the dynamic link library is loaded into the memory space for the process. At Step 60, a log entry is created in an injection log for the dynamic link library. If the dynamic link library is not appropriate to load into a memory space for the process, at Step 62, a log entry is created in the injection log indicating the dynamic link library was not appropriate to inject into the memory space for the process.

In one exemplary embodiment of the present invention, at Step 52, an injection driver is queried from the INJECT.DLL for a list of DLLs that should be injected into a process on Windows 95/98/NT. At Step 54, a loop is entered using the list of DLLs obtained from the injection driver. At Step 56, a test is conducted to determine if a DLL from the list is appropriate to load into a memory space for the process created by Windows 95/98/NT. The INJECT.DLL examines a DLL's location, internal functions, size, and other characteristics to determine if the DLL is appropriate to load into a memory space for the process.

If the DLL is appropriate to load into a memory space for the process, at Step 58 the DLL is loaded into a memory space for the process. The INJECT.DLL issues a Windows LoadLibrary function call. As is known in the art, the LoadLibrary function call is used to load a DLL from the Windows operating system.

At Step 60, a log entry is created in an injection log for the DLL that was loaded into memory space for the process. The log entry includes a name of a DLL loaded, a location, a timestamp, and other information about the DLL. If the DLL is not appropriate to load into a memory space for the process, at Step 62, a log entry is created in the injection log indicating the DLL was not appropriate to inject into the memory space for the process. This log entry includes a name of a DLL loaded, a location, a timestamp and a reason for not using the DLL.

Dynamically Injecting Dynamic Link Libraries using Injection Criteria

Functions in the injection driver can be called to send injection criteria associated with an injecting a dynamic link library.

Figure 5:
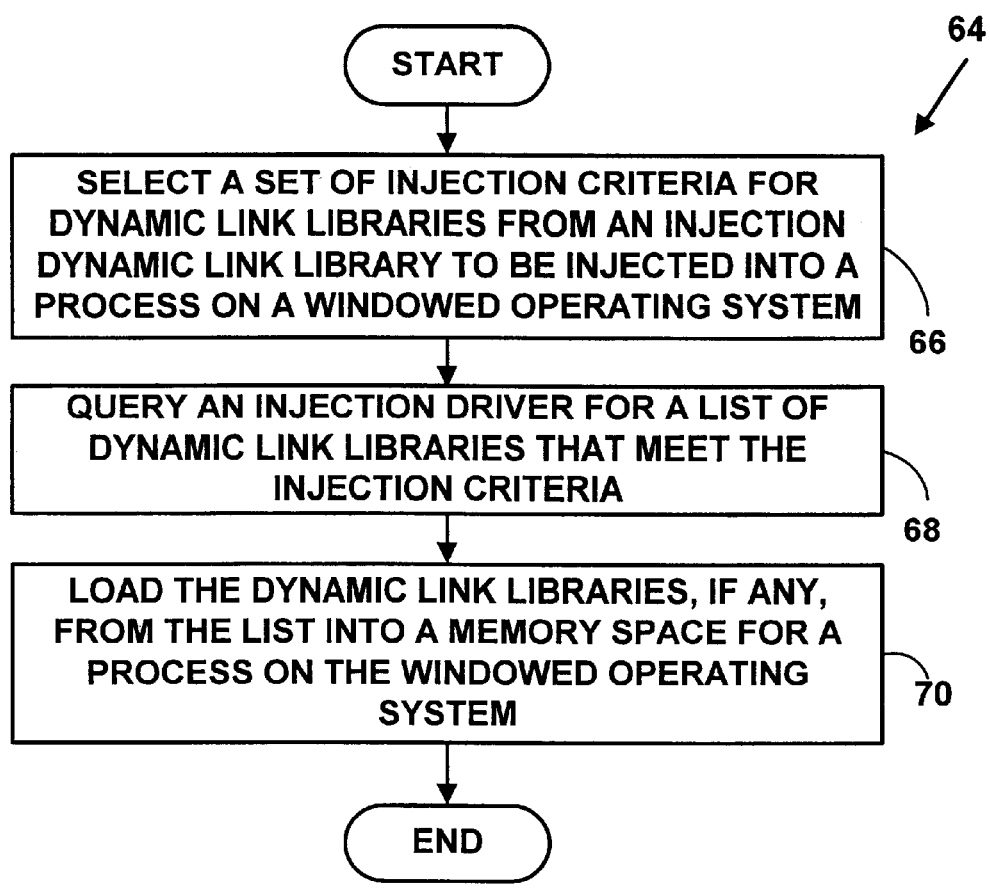
FIG. 5 is a flow diagram illustrating a method for dynamically selecting dynamic link libraries using injection criteria.

FIG. 5 is a flow diagram illustrating a Method 64 for dynamically selecting dynamic link libraries using injection criteria. At Step 66, a set of injection criteria is selected for dynamic link libraries from an injection dynamic link library that will be injected into a process on a windowed operating system. At Step 68, an injection driver is queried from the injection dynamic link library for a list of dynamic link libraries that meet the set of injection criteria. At Step 70, dynamic link libraries from the list, if any, are loaded into a memory space for the process by the injection dynamic link library.

In one exemplary embodiment of the present invention, at Step 66, a set of injection criteria is selected for DLLs from the INJECT.DLL that will be injected into a process on Windows 95/98/NT. At Step 68, an injection driver is queried from the INJECT.DLL for a list of DLLs that meet the set of injection criteria. At Step 70, DLLs from the list, if any, are loaded into a memory space for the Windows 95/98/NT process by the INJECT.DLL.

In one exemplary embodiment of the present invention, the injection criteria can include "cascade loading." As is known in the art, injecting the same dynamic link libraries into every new process as were injected into a process that creates a new process is called "cascade loading."

Exemplary System for Dynamically Injecting Dynamic Link Libraries

Figure 6:
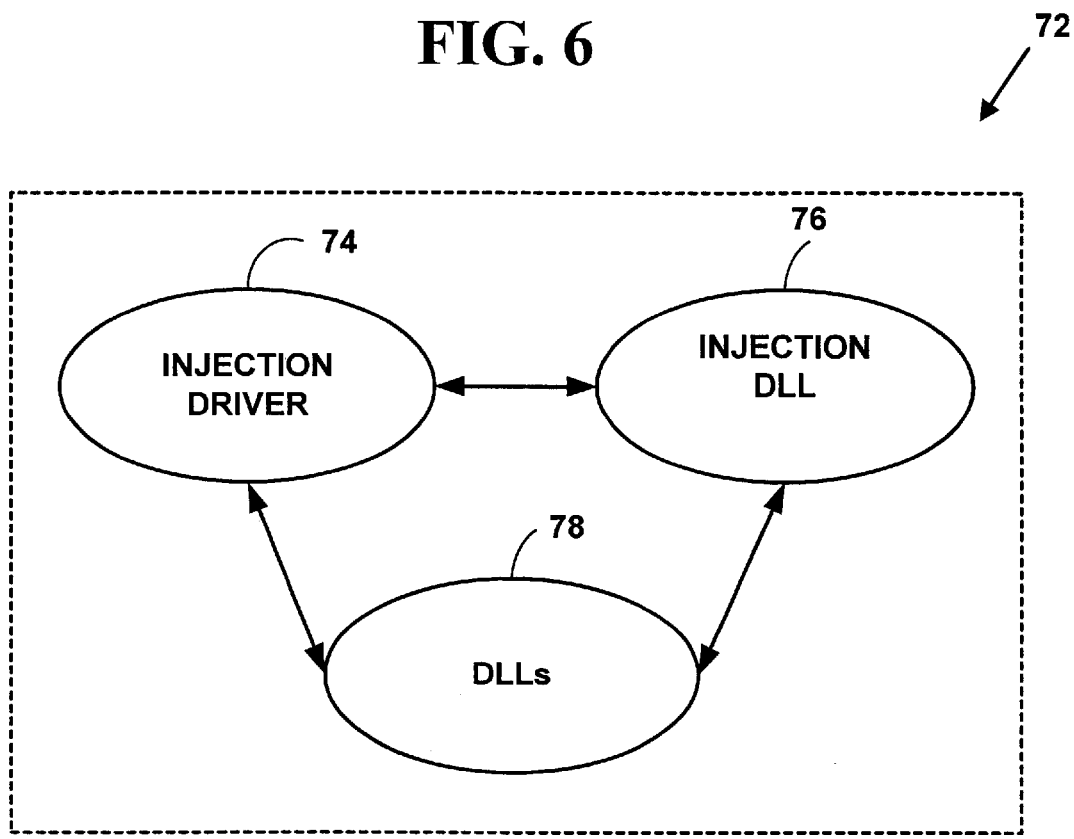
FIG. 6 is a block diagram illustrating a system for dynamically injecting dynamic link libraries.

FIG. 6 is a block diagram illustrating a system 72 for dynamically injecting dynamic link libraries. The system 72 includes an injection driver 74 and an injection dynamic link library 76. The injection driver 74 is used to determine if any dynamic link libraries 78 should be loaded for application related logic associated with a process on the windowed operating system, and to select dynamic link libraries 78 based on injection criteria.

The injection dynamic link library 76 includes multiple injection functions for executing injection logic for modifying a main kernel dynamic link library function in an original kernel dynamic link library to jump to an injection hook function within an injection dynamic link library. The injection functions from the injection dynamic link library are used to execute injection logic prior to executing any other applications related logic in a new process address space created by a windowed operating system. The injection dynamic link library 76 is also used for querying an injection driver from for a list of dynamic link libraries that should be injected into a process on a windowed operating system using injection criteria.

Exemplary embodiments of the present invention were described using any of Windows 95, Windows 98, or Windows NT by Microsoft Corporation of Redmond, Wash. However, the present invention is not limited to windowed operating systems by Microsoft, and other windowed operating systems could also be used.

The methods and system described herein result in specific dynamic link libraries being loaded into specific address spaces for specific processes in windowed operating systems. The dynamic link libraries are loaded prior to the execution of any application software related code in a process address space created by a windowed operating system.

Enabling Dynamic Interception of Exported Function Calls for Dynamic Link Libraries As was discussed above, it is desirable to provide flexible interception techniques to intercept exported function calls for dynamic link libraries. In one exemplary embodiment of the present invention, new interception techniques for exported functions for dynamic link libraries are provided.

Figure 7:
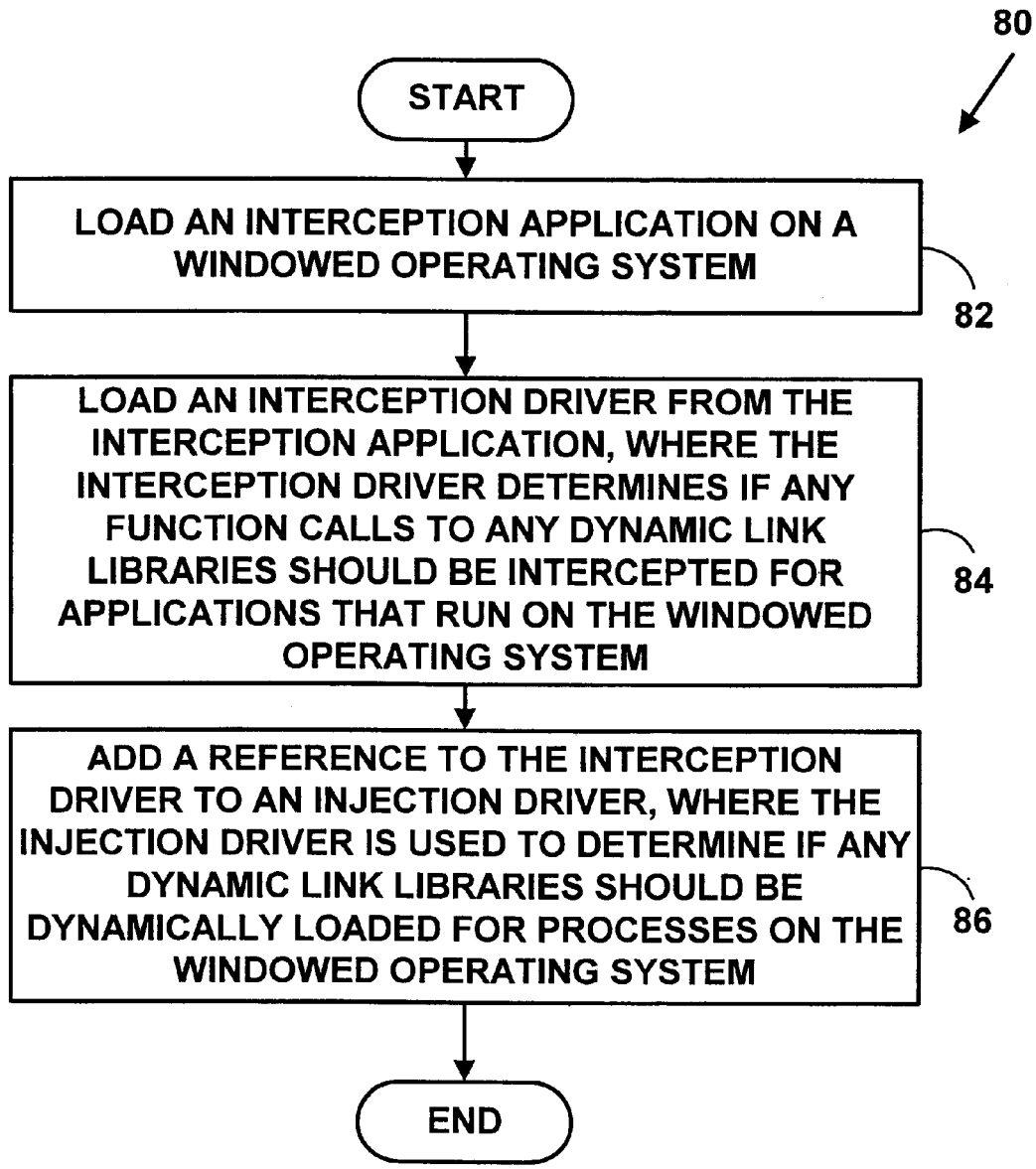
FIG. 7 is a flow diagram illustrating a method for preparing for dynamic interception of exported function calls for dynamic link libraries.

FIG. 7 is a flow diagram illustrating a Method 80 for creating dynamic interception of exported function calls for dynamic link libraries. At Step 82, an interception application is loaded on a windowed operating system. The interception application is used to provide to interception of exported functions calls for dynamic link libraries for multiple processes that run on a windowed operating system. At Step 84, an interception driver is loaded from the interception application. The interception driver includes interception logic to determine if interception of exported function calls for dynamic link libraries is requested for any application software associated with processes that run on the windowed operating system. At Step 86, a reference to the interception driver is added in an injection driver. The injection driver is used to determine if any dynamic link libraries should by dynamically loaded for application software that runs on the windowed operating system. The injection driver is called by injection logic that is injected into new processes that run on the windowed operating system by an injection application. The injection logic is executed prior to any application-related logic in a process address space created by the windowed operating system.

In one exemplary embodiment of the present invention, at Step 82 an interception application is loaded on a Windows 95/98/NT operating system (hereinafter Windows). The interception application is used to provide interception of explored function calls for Dynamic Link Libraries ("DLLs") for multiple processes that run on Windows. However, the present invention is not limited to windowed operating systems from Microsoft, and other operating systems could also be used.

As is known in the art, when a function in a Dynamic Link Library is made available to an executable module (".EXE") or another DLL, the function is "exported." When the DLL is linked, the linker detects information about the exported function. The linker automatically produces a library (".LIB") file that contains a list of symbols exported by the DLL. In addition to creating a LIB file, the linker embeds a table of exported symbols in the resulting DLL file. Entries in the table of exported symbols include an exported function's name and an address at which the function is located within the DLL's image. Table 1 illustrates an exemplary exported DLL function called "Subtract" that would be included in a .LIB file.

TABLE 1

```
// export DLL function Subtract()
// subtract two numbers
_declspec(dllexport) int Subract (int first_number, int second_number) {
   return(first_number-second_number);
}
```

Returning to FIG. 7, at Step 84, an interception driver is loaded from the interception application. The interception driver includes interception logic to determine if interception of exported function calls for DLLs is requested for any application software associated with processes that run on Windows. At Step 86, a reference to the interception driver is added in an injection driver. The injection driver is used to determine if DLLs should be dynamically loaded for application software that runs on Windows (e.g., using Step 36 of Method 32). The injection driver is called by injection logic that is injected into new processes that run on Windows by an injection application (Step 38 of Method 32). The injection logic is executed prior to any application software in a process address space created by Windows. However, other operating systems can also be used and the interception application and interception driver can also be used independently of the injection driver described in Method 32 of FIG. 2.

In one exemplary embodiment of the present invention, to intercept calls to functions exported by Window's DLLs, internal Windows components are used. The Windows GetProcAddress function exported by KERNEL32.DLL is used to find the address of an exported function for a currently loaded Windows module. As is known in the art, a Windows module (hereinafter "module") is a 16-bit or a 32-bit module that includes a collection of routines and data structures that perform a particular task or implements a particular abstract data type. A module typically consists of two parts: an interface, which lists constants, data types, variables and routines that can be accessed by other modules and routines; and an implementation that contains source code that actually implements the routines. The implementation is typically a "private" implementation (i.e., accessible only to the module).

Windows modules are typically stored in a Portable Executable ("PE") format. For more information on the Portable Executable header see, "Peering Inside the PE: A Tour of the Win32 Portable Executable File Format" by Matt Pietrek, Microsoft Systems Journal, March 1994, incorporated herein by reference. PE module file headers typically include an Export Table and an Import Table.

A PE Export Table typically includes a number of exported functions, addresses of exported functions within a module and a optional exported function names. An exported function can be located within a module using an ordinal number or a function name. As is known in the art, DLL functions can be exported by assigning the exported functions an ordinal number. An ordinal number is a number whose form indicates a position in an ordered sequence of items (e.g., a sequence of exported functions).

A PE Import table typically includes a name of each implicitly referenced module, for each module, a list of all functions implicitly referenced by the importing module, and space to store the addresses of the functions.

When a module is loaded into an address space, the Windows module loader also loads all modules that are "implicitly" referenced in the module's Import table. As is known in the art, implicit loading or "load-time dynamic linking" is used to load modules into a memory space at load-time. The Windows module loader fills in the Import table's exported function addresses for functions included in the Import table. Calls to implicitly referenced functions include a jump to an address of an exported function included in the Import table.

Modules that are not referenced implicitly are loaded "explicitly" using the Windows LoadLibrary and the LoadLibraryEx functions exported by the Windows kernel DLL, KERNEL32.DLL. As is known in the art, explicit loading allows a DLL's file image to be mapped into a process's address space when one of the process's threads calls either the LoadLibrary or the LoadLibraryEx functions.

Interception techniques known in the art alter exported function address entries only in the PE Import table for specific functions. These entries are replaced with an address of an interception routine. The interception routine can record the intercepted call, alter the parameters and call the function, or call another functions. However, the interception techniques known in the art have a number of problems as was discussed above.

Figure 8:
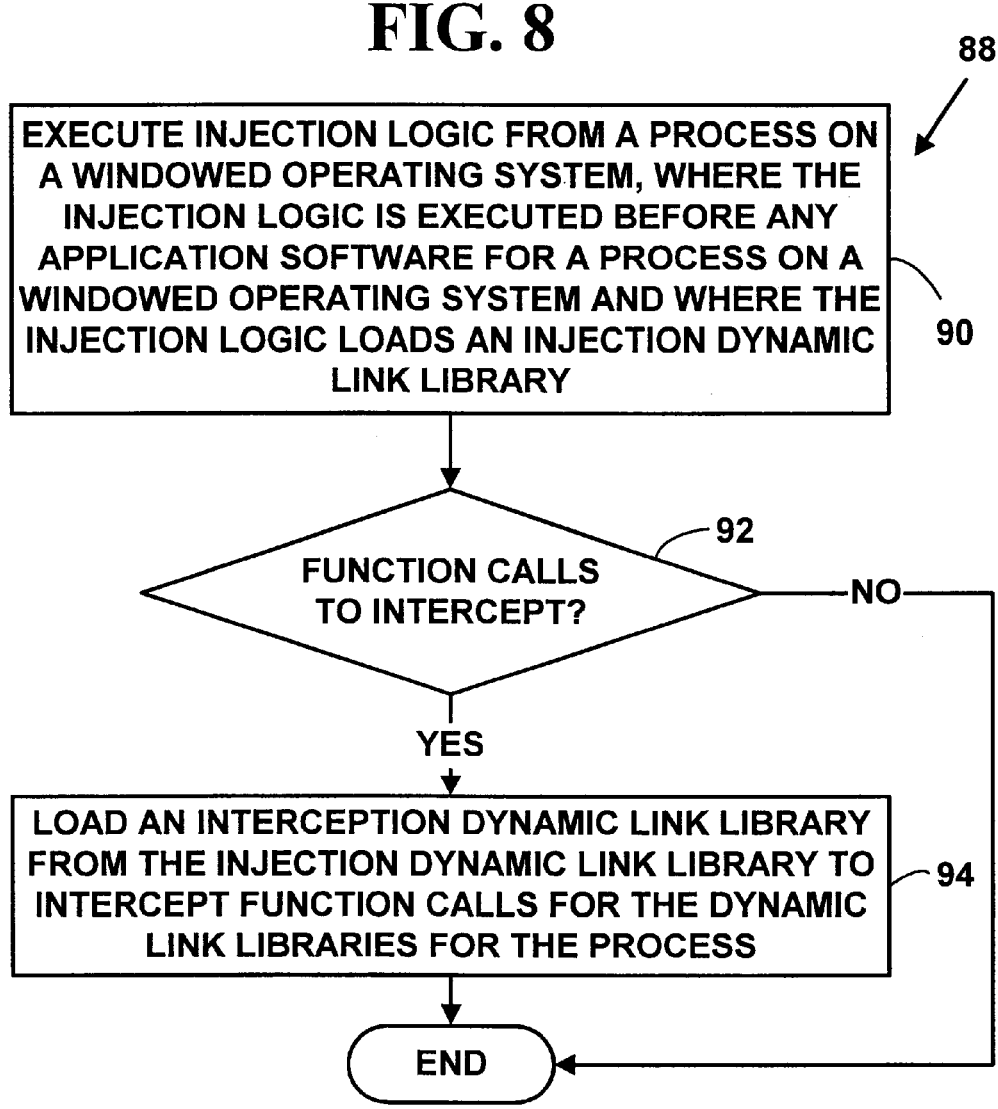
FIG. 8 is a flow diagram illustrating a method for allowing dynamically intercepting exported function calls for dynamic link libraries.

Allowing Dynamic Interception of Exported Function Calls for Dynamic Link Libraries FIG. 8 is a flow diagram illustrating a Method 88 for allowing dynamically intercepting exported function calls for dynamic link libraries. At Step 90, injection logic is executed from a process on the windowed operating system. The injection logic loads an injection dynamic link library to inject other dynamic link libraries into a memory space for the process on the windowed operating system. The injection logic is executed prior to any application software associated with the process. At Step 92, a test is conducted from an injection dynamic link library to determine whether any exported function calls to any dynamic link libraries should be intercepted for the process. If any exported function calls should be intercepted for the process, at Step 94 the injection dynamic link library loads an interception dynamic link library into the memory space for the process on the windowed operating system to intercept exported function calls to the dynamic link libraries for the process.

In one exemplary embodiment of the present invention, At Step 90, injection logic is executed for a process on Windows (e.g., Step 42 of Method 40). However, the present invention is not limited to this implementation. The injection logic loads an injection dynamic link library called INJECT.DLL to inject other dynamic link libraries into a memory space for the process on Windows (e.g., using Step 48 of Method 40). However, other injection dynamic link libraries could also be used, and the present invention is not limited to an injection DLL called INJECT.DLL or used with Method 40. The injection logic is executed prior to any application software associated with the process. At Step 92, a test is conducted from the INJECT.DLL to determine whether any exported function calls to any dynamic link libraries should be intercepted for the process. If any function calls should be intercepted for the process, at Step 94 the INJECT.DLL loads an interception dynamic link library called "INTERCEPT.DLL" into the memory space for the process Windows to intercept exported function calls to the DLLs for the process. However, other interception DLLs could also be used and the present invention is limited to an interception DLL called INTERCEPT.DLL. The INJECT.DLL issues a Windows LoadLibrary function call to load the INTERCPT.DLL in the memory space for the process.

Initializing Dynamic Interception Exported Function Calls for Dynamic Link Libraries FIG. 9 is a Method 96 for initializing dynamic interception of exported function calls for dynamic link libraries. At Step 98, an interception driver is queried from an interception dynamic link library for a list of dynamic link libraries, if any, for which exported function calls will be intercepted for a process on the windowed operating system. At Step 100, a loop is entered to repeat Steps 102, 104 and 104 from the interception dynamic link library using the list of dynamic link libraries obtained from the interception driver. At Step 102, an dynamic link library is loaded into a memory space for the process. At Step 104, the dynamic link library loaded is initialized in the memory space. At Step 106, a log entry is created in an interception log for the dynamic link library. At Step 108, multiple functions are provided from the interception dynamic link library that are callable by the dynamic link libraries. The multiple functions can be used to specify callback functions and a priority for the callback functions for specific exported function calls for dynamic link libraries for the process on the windowed operating system. At Step 110, an interception table is built on the interception dynamic link library, where an entry in the interception table includes exported functions from the dynamic link libraries that are marked for interception.

In one exemplary embodiment of the present invention, at Step 98, an interception driver (e.g., using interception driver from Method 80, FIG. 7) is queried from INTERCEPT.DLL for a list of DLLs and/or extension DLLs, if any, for which exported function calls will be intercepted for a process Windows. As is known in the art, an "extension DLL" is a DLL that adds functionality to an existing DLL.

At Step 100, a loop is entered to repeat Steps 102, 104 and 104 from the INTERCEPT.DLL using the list of DLLs obtained from the interception driver. At Step 102, an DLL is loaded into a memory space for the process. At Step 104, the loaded DLL is initialized in the memory space. At Step 106, a log entry is created in an interception log for the DLL.

The log entry includes a name of an DLL loaded, a location, a timestamp, a status for loading, a status for initializing and other information about the DLL. However, other log information can also be included in the log entry and the present invention is not limited to the log information described. If the DLL is not appropriate to load into a memory space for the process, at Step 104, a log entry is created in the injection log indicating the DLL was not appropriate to inject into the memory space for the process. Such a log entry includes a name of a DLL not loaded, a location, a timestamp and a reason for not using the DLL.

At Step 108, multiple functions are provided from INTERCEPT.DLL that are callable by the DLLs. The multiple functions can be used to specify callback functions and a priority for the callback functions for specific exported function calls for DLLs for the process on the windowed operating system. In one exemplary embodiment of the present invention, the multiple callback functions use the inputs included in Table 2. However, more or fewer inputs can also be used and the present invention is not limited to the inputs listed in Table 2.

TABLE 2

| CALLBACK FUNCTION INPUTS |
| --- |
| Module name |
| Function name or ordinal number |
| Callback type (e.g., before, replace, after) |
| Callback priority |
| Callback function address |

At Step 110, an interception table is built in INTERCEPT.DLL, where an entry in the interception table includes export functions from the DLLs that are marked for interception. In one exemplary embodiment of the present invention, the interception table includes the fields listed in Table 3. However, more or fewer fields can also be used and the present invention is not limited to the inputs listed in Table 3.

TABLE 3

| INTERCEPTION TABLE FIELDS |
| --- |
| Name of modules for which export functions are marked for interception. |
| For a module, a function name or ordinal number for desired export functions. |
| For a desired function, a function address in an address space for a process, a stub function, and a list of before, replace and after callback functions. |
| For callback functions, a callback address and a call back priority. |

The INTERCEPT.DLL has the capability to mark a module as not to be intercepted. This provides a way not to intercept functions called by an Extension DLL. The INTERCEPT.DLL also identifies when a module is loaded into an address space for a process. The identification identifying when an application executable module (.EXE), implicitly linked DLLs and explicitly linked DLLs.

Dynamically Intercepting Exported Function Calls for Dynamic Link Libraries

FIG. 10 is a Method 112 for dynamic interception of exported function calls for dynamic link libraries. At Step 114, a module loaded into an address space for a process on a windowed operating system is identified from an interception dynamic link library. The module is identified before the windowed operating system calls an initialization routine to initialize any dynamic link libraries associated with the module. At Step 116, an export table for the module is located. The export table includes a list of exported functions for dynamic link libraries. At Step 118 a test is conducted to determine whether the module exports any functions included in an interception table in the interception dynamic link library. If the module exports any functions included in the interception table, at Step 120 an address is added in the address space for the process for the exported functions to the interception table. At Step 122, an import table for the module is located. The import table includes a list of imported functions from dynamic link libraries. At Step 124, a test is conducted to determine whether the module imports any functions included in an interception table in the interception dynamic link library. If the module imports any functions included in an interception table, at Step 126, function addresses in the import table are replaced with addresses of stub functions in the interception dynamic link library. The stub functions set a reference to the interception table for the intercepted functions. The stub functions jump to a global interception function.

In one exemplary embodiment of the present invention, At Step 114, a module loaded into an address space for a process is identified from the INTERCEPT.DLL. In one exemplary embodiment of the present invention, the module is identified before Windows calls DllMain to initialize DLLs associated with the module. The INTERCEPT.DLL is able to intercept and identify explicitly called exported functions by adding an interception replacement callback function for the Windows KERNEL32.DLL GetProcAddress function in the interception table. The interception replacement function determines if the requested function address is for a function included in the interception table. If so, the interception replacement callback function returns the address of the stub function described for Step 126 for the intercepted exported function.

The INTERCEPT.DLL also maintains handles in resource tables when a function is intercepted. As is known in the art, a handle is a number to identify objects and resources created by Windows. A resource is a pre-defined object defined by Windows (e.g., dialog boxes, cursors, fonts, icons, etc.) The INTERCEPT.DLL can intercept function calls that are used to allocate a handle for a resource. The requested resource name and corresponding information is saved before the function call to allocate the resource handle. The returned resource handle is saved after the call, if the call was successful. The resource name and corresponding information are deleted from the INTERCEPT.DLL when the resource handle is freed.

Returning to FIG. 10 at Step 116, an export table for the module is located. The export table includes a list of exported functions for DLLs. At Step 118 a test is conducted to determine whether the module exports any functions included in an interception table in the INTERCEPT.DLL. If the module exports any functions included in the interception table, at Step 120 an address is added in the address space for the process for the exported functions to the interception table. At Step 122, an import table for the module is located. The import table includes a list of imported functions from DLLs. At Step 124, a test is conducted to determine whether the module imports any functions included in an interception table in the INTERCEPT.DLL. If the module imports any functions included in an interception table, at Step 126, function addresses in the import table are replaced with addresses of stub functions in INTERCEPT.DLL. The stub functions set a reference to the interception table for the intercepted functions. The stub functions jump to a global interception function.

Figure 11B:
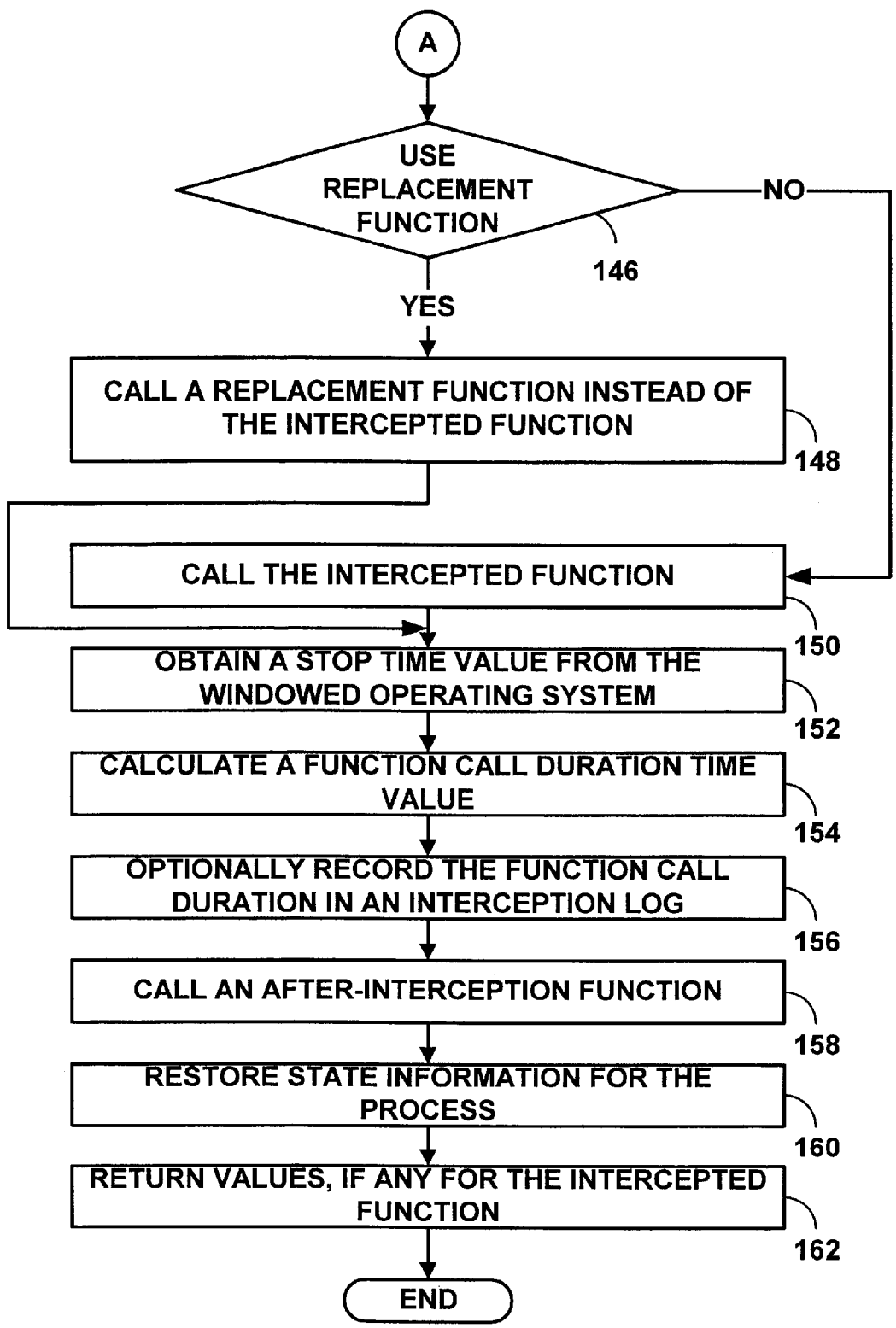

FIGS. 11A and 11B are a flow diagram illustrating a Method 128 dynamic interception of an exported function call to a dynamic link library using a global interception function. In FIG. 11A at Step 130 a function call for an exported function for a dynamic link library is received on a process on a windowed operating system. At Step 132, the exported function call is intercepted with an interception driver loaded into an address space for the process. At Step 134, a global interception function in an interception dynamic link library loaded into an address space for the process is jumped to. At Step 136, dynamic interception of the function call from the global interception function is provided by Steps 138–150. At Step 138, state information is saved for the process. At Step 140, original calling parameters are saved for the intercepted function call. At Step 142, a start time value is obtained for the intercepted function call from the windowed operating system. At Step 144, a before interception function with a first pointer to a first interception table entry in an interception table in the interception dynamic link library is called.

In FIG. 11B at Step 146, a test is conducted to whether the call to the intercepted function call should be overridden by a replacement interception function. If the replacement interception function should be overwritten, then at Step 148, a replacement interception function is called with a second pointer to a second interception table entry. If a replacement function should not be called, at Step 150, the actual intercepted function is called.

At Step 152, a stop time value is obtained from the windowed operating system. At Step 154, a function call duration time is calculated using the start time value and the stop time value. At Step 156, the function call duration is optionally recorded in an interception log associated with the interception dynamic link library. At Step 158, an after-interception function is called with a third pointer to a third interception table entry. At Step 160, state information is restored for the process. At Step 162, return values, if any, are returned from the global interception function for the intercepted function call.

In one exemplary embodiment of the present invention, in FIG. 11A at Step 130 a function call for an exported function for a DLL is received on a process on Windows. At Step 132, the exported function call is intercepted with an interception driver loaded into an address space for the process. In one exemplary embodiment of the present invention, the interception driver is the interception driver from Step 84 of Method 80 (FIG. 7). However, other interception drivers can also be used and the present invention is not limited to the interception driver described for Method 80. At Step 134, a global interception function in INTERCEPT.DLL is jumped to. At Step 136, dynamic interception of the function call from the global interception function is provided by Steps 138–150. At Step 138, state information is saved for the process. At Step 140 original calling parameters are saved for the intercepted function call. At Step 142, a start time value is obtained for the intercepted function call from Windows. At Step 144, a before-interception function with a first pointer to a first interception table entry in an interception table in the INTERCEPT.DLL is called. In one exemplary embodiment of the present invention, the interception table is the interception table created at Step 110 of Method 96 (FIG. 9). However, the present invention is not limited to the invention table created with Method 96 and other interception tables can also be used. In one exemplary embodiment of the present invention, Step 144 includes obtaining a priority ordering for multiple before-interception functions from an interception table entry for the intercepted function call. The multiple before-interception functions are called using the priority ordering. The priority ordering allows multiple before-interception functions to be executed using a priority determined by a user. This provides flexibility for a user to execute multiple before-interception functions, including callback functions for an intercepted function call.

In FIG. 11B at Step 146, a test is conducted to determine whether the call to the intercepted function call should be overridden by a replacement-interception function. If the replacement interception function should be overwritten, then at Step 148, a replacement-interception-function is called with a second pointer to a second interception table entry.

In one exemplary embodiment of the present invention, Step 148 includes obtaining a priority ordering for multiple replacement functions from an interception table entry for the intercepted function call. The following steps are repeated for multiple replacement functions using the priority ordering. A replacement-interception function is called. A return value is returned indicating that the replacement-interception function was called instead of the exported function. The return value is recorded in the interception table for the replacement-interception function. In this exemplary embodiment of the present invention, the interception table is the interception table created at Step 110 of Method 96 (FIG. 9). However, the present invention is not limited to the invention table created with Method 96 and other interception table can also be used. The priority ordering allows multiple replacement-interception functions to be executed using a priority determined by a user. This provides flexibility for a user to execute multiple replacement-functions, including callback functions for an intercepted function call.

If a replacement-interception function should not be called, at Step 150, the actual intercepted function is called. This allows a user flexibility to call one or more before-interception functions, the actual intercepted function, and then one or more after-interception functions without using replacement interception functions.

At Step 152, a stop time value is obtained from Windows. At Step 154, a function call duration time is calculated using the start time value and the stop time value. At Step 156, the function call duration is optionally recorded in an interception log associated with the interception dynamic link library. In one exemplary embodiment of the present invention, the log entry is a log entry in an interception log created at Step 106 of Method 96 (FIG. 7). However, other log entries can also be used and the present invention is not limited to entries in the interception log created with Method 96. The function call duration can be used to alter the behavior of the intercepted function, as well as for debugging applications.

At Step 158, an after-interception function is called with a third pointer to a third interception table entry. In one exemplary preferred embodiment of the present invention, Step 158 includes obtaining a priority ordering for multiple after-interception functions from an interception table entry for the intercepted function call. The multiple after-interception functions are called using the priority ordering. The priority ordering allows multiple after-interception functions to be executed using a priority determined by a user. This provides flexibility for a user to execute multiple after-interception functions, including callback functions for an intercepted function call.

At Step 160, state information is restored for the process. At Step 162, return values, if any, are returned from the global interception function for the intercepted function call. The entity calling the intercepted function (e.g., a process thread) receives the return values and is not able to determine that the function was intercepted and one or more before-interception, replacement or after-interception functions may be been called based on a pre-determined priority.

The INTERCEPT.DLL provides a callable interface that allows a caller to specify a callback function to be called when a module is loaded into an address space for a process. The INTERCEPT.DLL calls a module load notification callback function when a module is loaded into an address space for the process. The INTERCEPT.DLL also provides a callable interface that returns resource name information for a requested handle.

Exemplary Exported Function Call Interception System

Figure 12:
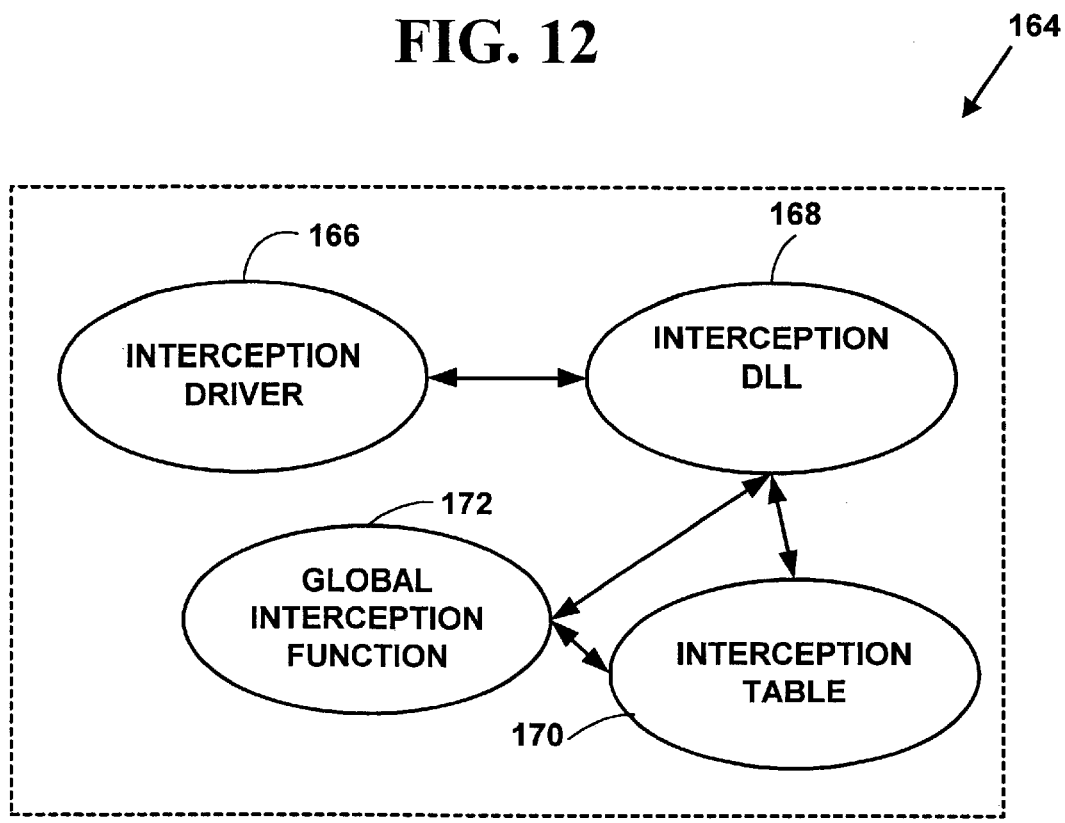
FIG. 12 is a block diagram illustrating a system for dynamic interception of exported function calls for dynamic link libraries.

FIG. 12 is a block diagram illustrating a System 164 for dynamic interception of exported function calls for dynamic link libraries. The System 164 includes an interception driver 166, and interception dynamic link library 168, an interception table 170 and a global interception function 172. However, more or fewer components could also be used in System 164 and the present invention is not limited to the system illustrated in FIG. 12.

The interception driver 166 is used for determining if any exported function calls for any dynamic link libraries associated with a process on the windowed operating system should be intercepted (e.g., Method 96 of FIG. 9). The interception dynamic link library 168 includes an interception table, multiple stub functions for replacing calls to imported functions and jumping to a global interception function. The interception dynamic link library 168 intercepts called functions included in the interception table (e.g., Method 112 of FIG. 10 and Method 128 of FIGS. 11A and 11B).

The interception table 170 is used for recording multiple exported functions for dynamic link libraries that should be intercepted (e.g., Method 112 of FIG. 10). The global interception function 172 is used for providing dynamic interception of exported function calls to dynamic link libraries in an address space of a process on a windowed operating system. The global interception function executes multiple functions including one or more before-interception functions, one or more replacement-functions and one or more after-interception functions using a pre-determined priority for each type of function (e.g., Method 128 of FIGS. 11A and 11B). The System 164 may also optionally include an interception log (not illustrated in FIG. 12) for recording information about intercepted functions (e.g., created at Step 106 of Method 96) and one or more resources tables to maintain handles allocated for resources requested by an intercepted function (e.g., see Step 114 of Method 112).

The methods and system of preferred embodiments of the present invention may allow calls to exported functions in a dynamic link library on a windowed operating system to be dynamically intercepted. The methods and system may be used to determine what resources a process uses on a windowed operating system, alter the behavior of specific functions in order to alter how an application executes, or for other monitoring or debugging purposes. The methods and system described herein are not application or process specific and may be used to intercept exported function calls for virtually any process on a windowed operating system such as Windows 95, Windows 98, Windows NT and others, and supports dynamic interception of multiple exported functions for multiple processes.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or embodiments have been described as being implemented in software, in other embodiments hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

I claim:

1. In a computer with a windowed operating system with having a plurality of processes, a method for dynamically intercepting function calls for dynamic link libraries in the windowed operating system, comprising the steps of:

loading an interception application on the windowed operating system, wherein the interception application is used to provide interception of functions calls for dynamic link libraries for plurality of processes that run on a windowed operating system;

loading an interception driver from the interception application, wherein the interception driver includes interception logic to determine if interception of function calls for dynamic link libraries is requested for any application software associated with processes that run on the windowed operating system; and adding a reference to the interception driver in an injection driver, wherein the injection driver is used to determine if any dynamic link libraries should be loaded for application software that runs on the windowed operating system, wherein the injection driver is called by injection logic that is injected into new processes that run on the windowed operating system by an injection application and wherein the injection logic is executed prior to any application related logic in a process address space created by the windowed operating system.

2. A computer readable medium having stored therein instructions for causing a central processing unit to execute a method for dynamically intercepting function calls for dynamic link libraries in a windowed operating system in a computer having a plurality of processes, the method comprising the steps of:

loading an interception application on the windowed operating system, wherein the interception application is used to provide interception of functions calls for dynamic link libraries for the plurality of processes that run on the windowed operating system;

loading an interception driver from the interception application, wherein the interception driver includes interception logic to determine if interception of function calls for dynamic link libraries is requested for any application software associated with processes that run on the windowed operating system; and adding a reference to the interception driver in an injection driver, wherein the injection driver is used to determine if any dynamic link libraries should be loaded for application software that runs on the windowed operating system, wherein the injection driver is called by injection logic that is injected into new processes that run on the windowed operating system by an injection application, the injection logic queries the injection driver to determine if any dynamic link libraries should be injected into the new processes, and wherein the injection logic is executed prior to any application related logic in a process address space created by the windowed operating system.

3. The method of claim 1 wherein the windowed operating system is any of Windows 95, Windows 98 or Windows NT.

4. The method of claim 1 wherein the dynamic link libraries are any of Windows 95, Windows 98, or Windows NT dynamic link libraries.

5. In a computer with a windowed operating system having a plurality of processes, a method for dynamic interception of function calls for dynamic link libraries on the windowed operating system, comprising the steps of:

executing injection logic for a process on the windowed operating system, wherein the injection logic loads an injection dynamic link library to inject other dynamic link libraries into a memory space for the process on the windowed operating system and wherein the injection logic is executed prior to any application software associated with the process;

determining from an injection dynamic link library whether any exported function calls to any dynamic link libraries should be intercepted for the process, and if so, loading from the injection dynamic link library an interception dynamic link library into the memory space for the process on the windowed operating system to intercept exported function calls to the dynamic link libraries for the process.

6. A computer readable medium having stored therein instructions for causing a central processing unit to execute a method for dynamic interception of function calls for dynamic link libraries on a windowed operating system in a computer having a plurality of processes, the method comprising the steps of:

executing injection logic for a process on the windowed operating system, wherein the injection logic loads an injection dynamic link library to inject other dynamic link libraries into a memory space for the process on the windowed operating system and wherein the injection logic is executed prior to any application software associated with the process;

determining from the injection dynamic link library whether any exported function calls to any-dynamic link libraries should be intercepted for the process, and if so, loading from the injection dynamic link library an interception dynamic link library into the memory space for the process on the windowed operating system to intercept exported function calls to the dynamic link libraries for the process.

7. The method of claim 5 wherein the windowed operating system is any of Windows 95, Windows 98 or Windows NT.

8. The method of claim 5 wherein the injection dynamic link library is called INJECT.DLL and the interception dynamic link library is called INTERCEPT.DLL on the windowed operating system.

9. In a computer with a windowed operating system with a plurality of processes, a method for initializing interception of exported function calls to dynamic link libraries for a process on the windowed operating system, comprising the steps of:
querying an interception driver from an interception dynamic link library for a list of dynamic link libraries for which exported function calls will be intercepted for a process on the windowed operating system;
repeating steps (a)–(c) from the interception dynamic link library using the list of dynamic link libraries obtained from the interception driver:
(a) loading an dynamic link library into a memory space for the process,
(b) initializing the dynamic link library loaded into the memory space, and
(c) creating a log entry in an interception log for the dynamic link library;
providing from the interception dynamic link library, a plurality of functions callable by the dynamic link libraries, wherein the plurality of functions can be used to specify callback functions and a priority for the callback functions for specific exported function calls for dynamic link libraries for the process on the windowed operating system; and
building an interception table on the interception dynamic link library, where an entry in the interception table includes exported functions from the dynamic link libraries that are marked for interception.

10. A computer readable medium having stored therein instructions for causing a central processing unit to execute the method of claim 9.

11. The method of claim 9 wherein the windowed operating system is any of Windows 95, Windows 98 or Windows NT.

12. The method of claim 9 wherein the log entry includes any of includes a name of a dynamic link library loaded, a location for a dynamic link library, a timestamp, a result returned from loading a dynamic link library or a result from initializing a dynamic link library.

13. The method of claim 9 wherein the a plurality of functions callable by the dynamic link libraries include inputs for any of: a module name, function name or ordinal number, a callback type, a callback priority or a callback function address.

14. The method of claim 9 wherein the interception table includes fields for any of: modules that export functions that are marked for interception, a function name or an ordinal number for modules for a desired export function, a function address for a desired function, a stub function and a list of before, replace and after callback functions, a callback address or a callback priority for callback functions.

15. In a computer with a windowed operating system with a plurality of processes, a method for dynamic interception of exported function calls to dynamic link libraries for a process on the windowed operating system, comprising the steps of:
identifying from an interception dynamic link library when a module is loaded into an address space for a process, wherein the module is identified before the windowed operating system calls an initialization routine to initialize any dynamic link libraries associated with the module;
locating an export table for the module, wherein the export table includes a list of exported functions;
determining whether the module exports any functions included in an interception table in the interception dynamic link library, and if so,
adding an address in the address space for the process for the exported functions to the interception table;
locating an import table for the module, wherein the import table includes a list of imported functions; and
determining whether the module imports any functions included in an interception table in the interception dynamic link library, and if so,
replacing function addresses in the import table with addresses of stub functions in the interception dynamic link library.

16. A computer readable medium having stored therein instructions for causing a central processing unit to execute the method of claim 15.

17. The method of claim 15 wherein the windowed operating system is any of Windows 95, Windows 98 or Windows NT.

18. The method of claim 15 wherein the stub functions jump to a global interception function in the interception dynamic link library.

19. The method of claim 15 wherein the step of identifying from an interception dynamic link library when a module is loaded into an address space for a process includes:
adding an interception replacement callback function for a function that returns a function address in a kernel dynamic link library for the windowed operating system;
determining from the interception replacement callback function if an intercepted function address is for a function that is included in the interception table, and if so,
returning the address of a stub function in the interception dynamic link library, wherein the stub functions jumps to a global interception function in the interception dynamic link library.

20. The method of claim 15 wherein the function that returns a function address is a function called GetProcAddress in a kernel dynamic link library called KERNEL32.DLL.

21. The method of claim 15 wherein he windowed operating system is any of Windows 95, Windows 98, or Windows NT.

22. The method of claim 15 wherein the step of identifying from an interception dynamic link library when a module is loaded into an address space for a process includes:
maintaining a resource table for resources requested by intercepted functions;
saving a requested resource name and corresponding resource information in the resource table before calling a function to allocate a resource handle;
determining whether the call to allocate a resource was successful, and if so, saving a returned resource handle in the resource table; and
deleting the resource name and corresponding information from the resource table when the resource handle is freed.

23. The method of claim 15 wherein the module is a portable executable module used on the windowed operating system.

24. In a computer with a windowed operating system with a plurality of processes, a method for dynamic interception of an exported function call to a dynamic link library for a process on the windowed operating system with a global interception function, comprising the steps of:

receiving an function call for an exported function for a dynamic link library on a process on a windowed operating system;

intercepting the exported function call with an interception driver loaded into an address space for the process;

jumping to an global interception function in an interception dynamic link library loaded into an address space for the process;

providing dynamic interception of the function call from the global interception function by:

saving state information for the process;

saving original calling parameters for the function call;

obtaining a start time value for the function call from the windowed operating system;

calling a before-interception function with a first pointer to a first interception table entry in an interception table in the interception dynamic link library;

determining whether the call to the intercepted function should be overridden by an replacement interception function, and if so, calling a replacement-interception function with a second pointer to a second interception table entry;

and if not, calling the actual intercepted function;

obtaining a stop time value from the windowed operating system;

computing a function call duration time using the start time value and the stop time value;

optionally recording the function call duration in an interception log associated with the interception dynamic link library;

calling an after-interception function with a third pointer to a third interception table entry;

restoring state information for the process; and returning return values, if any, from the global interception function for the intercepted function call.

25. A computer readable medium having stored therein instructions for causing a central processing unit to execute the method of claim 24.

26. The method of claim 24 wherein the windowed operating system is any of Windows 95, Windows 98 or Windows NT.

27. The method of claim 24 wherein the step of calling a before-interception function includes:

obtaining a priority ordering for a plurality of before-interception functions from an interception table entry for the intercepted function call;

calling the plurality of before-interception functions using the priority ordering.

28. The method of claim 24 wherein the step of calling a replacement-interception function includes:

obtaining a priority ordering for a plurality of replacement functions from an interception table entry for the intercepted function call;

repeating steps (a)–(c) for the plurality of replacement functions using the priority ordering:

(a) calling a replacement-interception function;

(b) returning a return value indicating that the replacement-interception function was called instead of the exported function; and (c) recording the return value in the interception table for the replacement-interception function.

29. The method of claim 24 wherein the step of calling an after-interception function includes:

obtaining a priority ordering for a plurality of after-interception functions from an interception table entry for the intercepted function call;

calling the plurality of after-interception functions using the priority ordering.

30. A system for dynamically intercepting exported function calls for dynamic link libraries on processes on a windowed operating system, comprising in combination:

an interception driver for determining if any exported function calls for any dynamic link libraries associated with a process on the windowed operating system should be intercepted;

an interception dynamic link library with an interception table and a plurality of stub functions for replacing calls to imported functions and jumping to a global interception function, wherein the interception dynamic link library intercepts called functions included in the interception table;

an interception table for recording a plurality of exported functions for dynamic link libraries that should be intercepted; and a global interception function for providing dynamic interception of exported function calls to dynamic link libraries in an address space of a process on a windowed operating system, wherein the global interception function executes multiple functions including a plurality of before-interception functions, a plurality of replacement-functions and a plurality of after-interception functions using a pre-determined priority for each type of function.

31. The system of claim 30 wherein the windowed operating system is any of Windows 95, Windows 98, or Windows NT.

32. The system of claim 30 further comprising:

an interception log for recording information about intercepted functions; and a plurality of resources tables to maintain handles allocated for resources requested by an intercepted function.

* * * * *